(12) United States Patent
Kamoshida et al.

(10) Patent No.: US 11,008,910 B2
(45) Date of Patent: May 18, 2021

(54) EXHAUST GAS POST-PROCESSING DEVICE AND ENGINE

(71) Applicant: Komatsu Ltd., Tokyo (JP)

(72) Inventors: Yasuhiro Kamoshida, Tokyo (JP); Tomohiro Horiuchi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 26 days.

(21) Appl. No.: 16/474,080

(22) PCT Filed: Dec. 26, 2018

(86) PCT No.: PCT/JP2018/047861
§ 371 (c)(1),
(2) Date: Jun. 27, 2019

(87) PCT Pub. No.: WO2019/098394
PCT Pub. Date: May 23, 2019

(65) Prior Publication Data
US 2020/0208555 A1 Jul. 2, 2020

(51) Int. Cl.
*F01N 3/00* (2006.01)
*F01N 13/00* (2010.01)

(52) U.S. Cl.
CPC .......... *F01N 3/005* (2013.01); *F01N 13/001* (2013.01)

(58) Field of Classification Search
CPC ......... F01N 3/005; F01N 3/021; F01N 13/011
See application file for complete search history.

(56) References Cited

U.S. PATENT DOCUMENTS

| 5,121,602 A | 6/1992 | McCorvey |
| 5,167,934 A | 12/1992 | Wolf et al. |
| 6,367,260 B1* | 4/2002 | Kasai ................. F02G 5/02 60/648 |
| 9,169,808 B2 | 10/2015 | Kitagawa |
| 2015/0275476 A1 | 10/2015 | Sakai |

FOREIGN PATENT DOCUMENTS

| CN | 104093912 A | 10/2014 |
| EP | 1333167 A1 | 8/2003 |
| JP | 59-071916 U | 5/1984 |

(Continued)

*Primary Examiner* — Audrey K Bradley
(74) *Attorney, Agent, or Firm* — Locke Lord LLP; James E. Armstrong, IV; Nicholas J. DiCeglie, Jr.

(57) ABSTRACT

The exhaust gas post-processing device includes: an exhaust gas post-processing unit into which an exhaust gas is introduced; a drain pipe connected to a lower portion of the exhaust gas post-processing unit; and a junction member. The junction member includes an introduction flow path, one end of which is an introduction port connected to the drain pipe, the introduction flow path extending in a horizontal direction from the introduction port, and the other end of the introduction flow path being an introduction-side gas vent hole opened to an outside. A discharge flow path is connected to a lower portion of the introduction flow path, that extends, in the horizontal direction, in a direction intersecting the introduction flow path, and an end portion of the discharge flow path being a discharge port opened to the outside. The exhaust gas post-processing device further includes a drainage pipe connected to the discharge port.

15 Claims, 8 Drawing Sheets

(56) References Cited

FOREIGN PATENT DOCUMENTS

| | | | |
|---|---|---|---|
| JP | S62-082215 | A | 4/1987 |
| JP | 02-501942 | A | 6/1990 |
| JP | 106-248944 | A | 9/1994 |
| JP | 11-072018 | A | 3/1999 |
| JP | 2012-219638 | A | 11/2012 |
| JP | 5226098 | B2 | 7/2013 |

* cited by examiner

EXHAUST GAS POST-PROCESSING DEVICE AND ENGINE

TECHNICAL FIELD

The present invention relates to an exhaust gas post-processing device and an engine.

BACKGROUND TECHNOLOGY

The engine is provided with an exhaust-gas post-processing device for cleaning an exhaust gas discharged from an engine main body. A drain pipe is provided in a lower portion of the exhaust-gas post-processing device for discharging water that has entered into an inside portion of the exhaust-gas post-processing device due to condensate water, or the like, coming from moisture contained in rain water and the exhaust gas.

In Patent Document 1, a drain device is disclosed in which a drainage pipe is connected to a lower end of a drain pipe.

PRIOR ART DOCUMENT

Patent Document

Patent Document 1: Japanese Unexamined Patent Application Publication No. 2012-219638

SUMMARY OF THE INVENTION

Problems to be Solved by the Invention

During operation of the engine, part of the high temperature exhaust gas discharged from of the engine main body to the exhaust gas post-processing device may flow through the drain pipe and drainage pipe in this order. In this case, there is a possibility that the drainage pipe will be deteriorated by the heat of the exhaust gas. For example, in a case where part of a drainage pipe is made of a rubber pipe (elastic pipe), the elastic pipe deteriorates due to the heat of the exhaust gas.

The present invention is provided to address such a problem and has an object to provide an exhaust gas post-processing device capable of suppressing deterioration of a drainage pipe caused by exhaust gas and an engine provided with the same.

Means for Solving the Problem

A first aspect of the present invention provides an exhaust gas post-processing device including: an exhaust gas post-processing unit into which an exhaust gas is introduced; a drain pipe connected to a lower portion of the exhaust gas post-processing unit; and a junction member, wherein the junction member has: an introduction flow path, one end of which is an introduction port connected to the drain pipe, the introduction flow path extending in a horizontal direction from the introduction port, and the other end of the introduction flow path is an introduction-side gas vent hole opened to an outside; and a discharge flow path connected to a lower portion of the introduction flow path, the discharge flow path extending, in the horizontal direction, in a direction intersecting the introduction flow path, and an end portion of the discharge flow path being a discharge port opened to an outside, wherein the exhaust gas post-processing device further includes a drainage pipe connected to the discharge port.

An engine according to the first aspect of the present invention includes the exhaust gas post-processing device and an exhaust gas main body for discharging exhaust gas.

Effect of Invention

According to the present invention, deterioration of the drainage pipe due to the exhaust gas can be suppressed.

MODE FOR CARRYING OUT THE INVENTION

Figure 1:
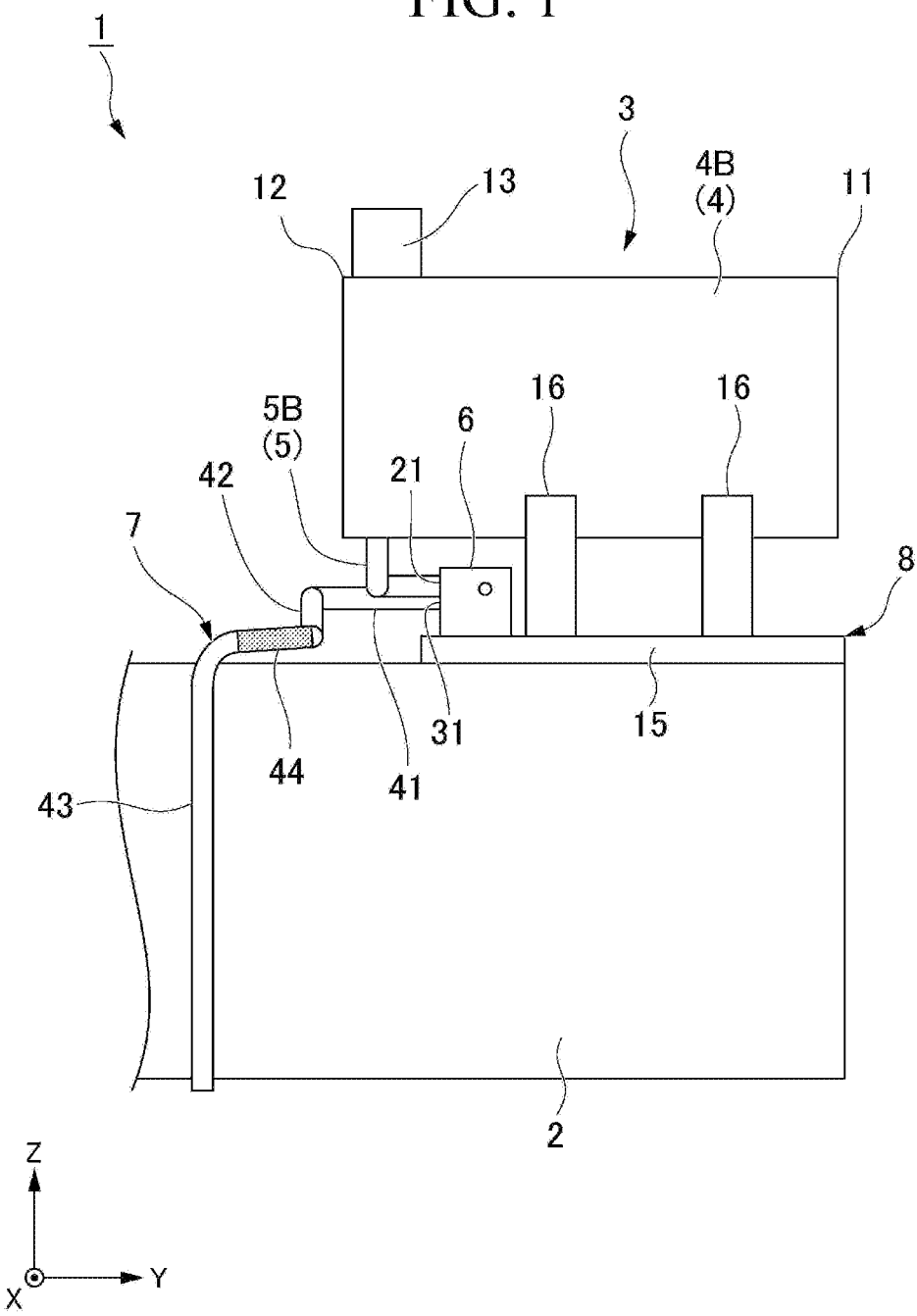
FIG. 1 is a side view showing an engine including an exhaust gas post-processing device according to an embodiment of the present invention.
Figure 2:
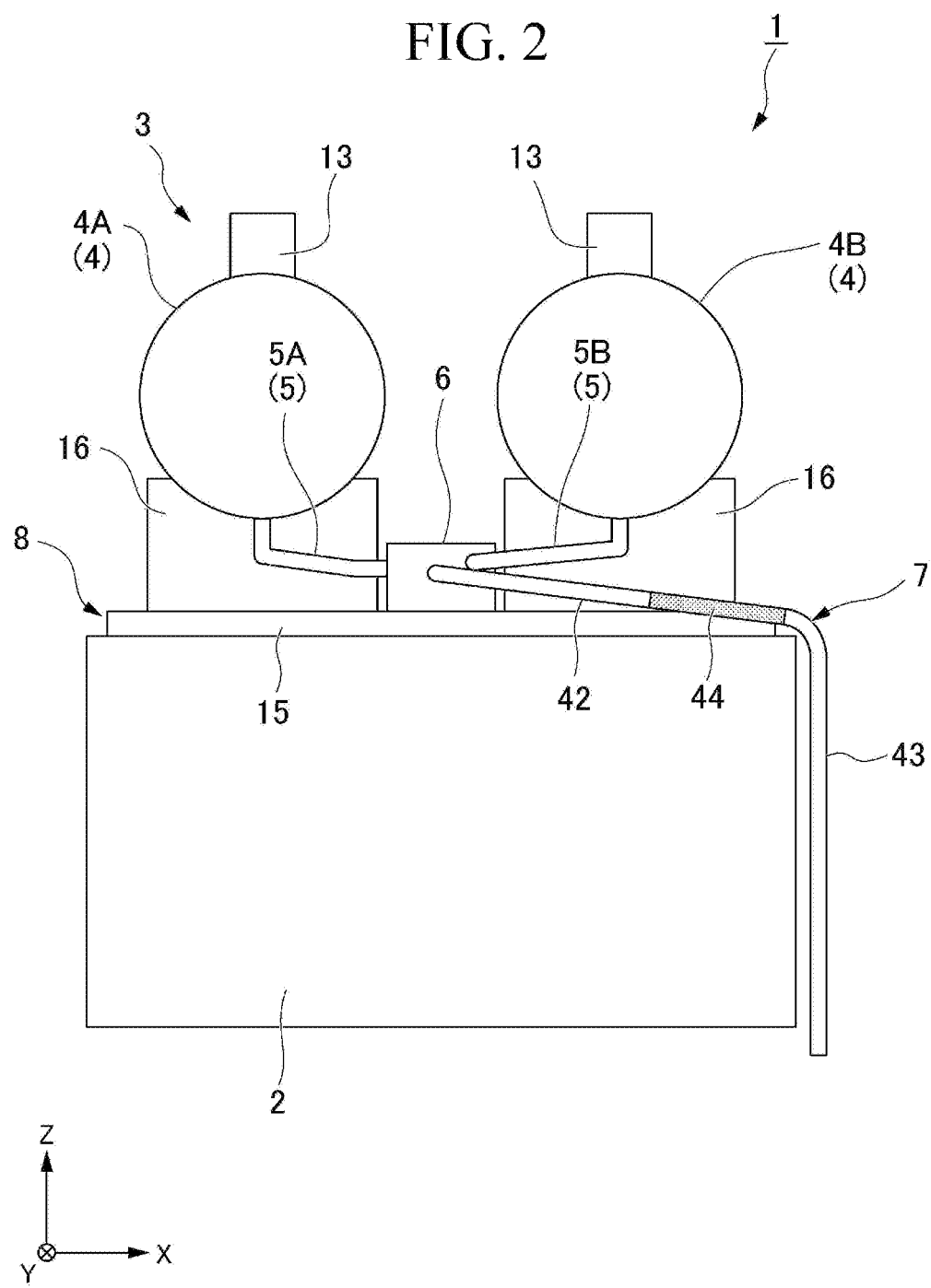
FIG. 2 is a front view showing the engine of FIG. 1.
Figure 3:
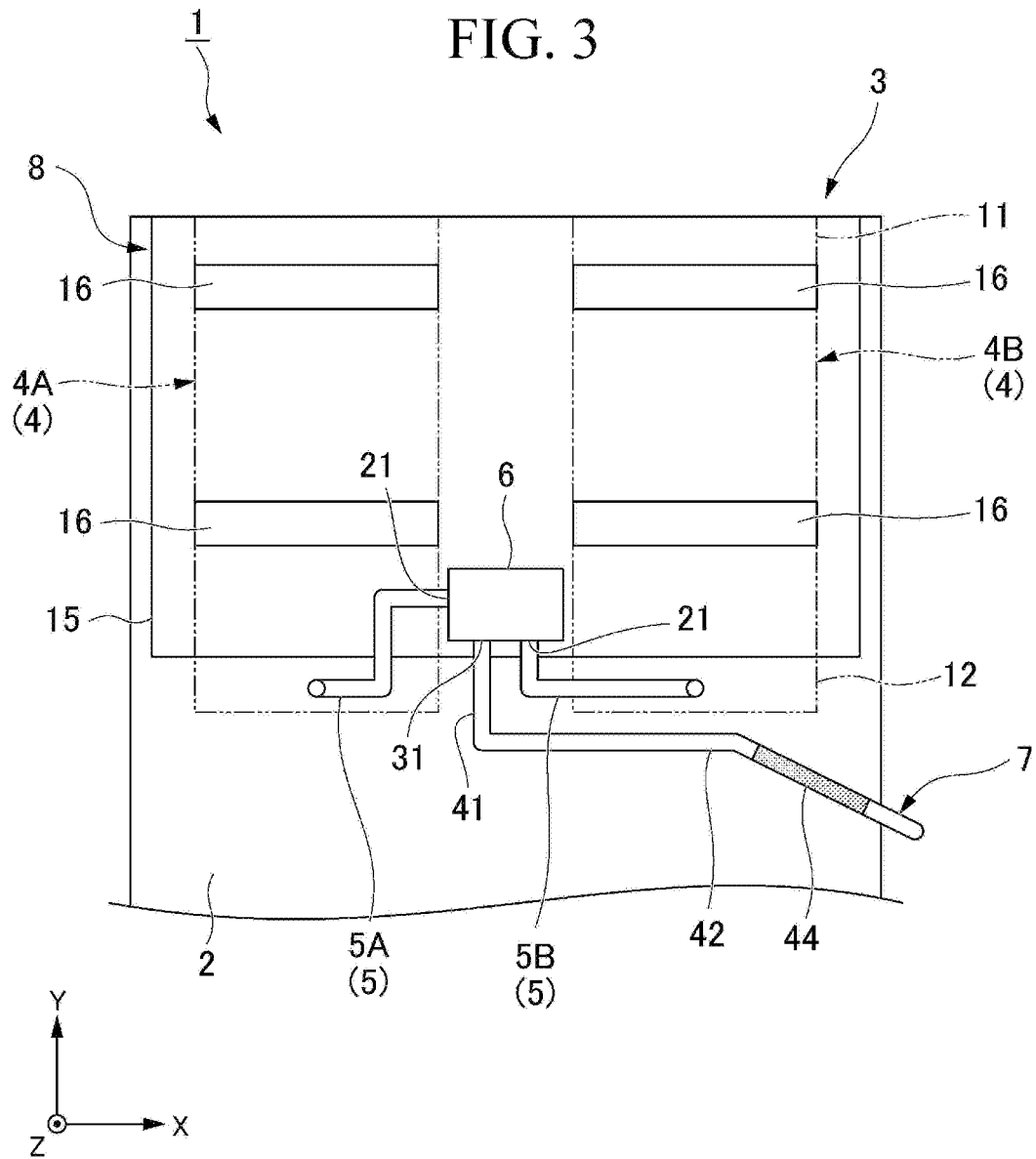
FIG. 3 is a top view showing the engine of FIG. 1.

Hereinafter, an embodiment of the present invention will be described in detail with reference to FIGS. 1 to 7. As shown in FIGS. 1 to 3, an engine 1 according to the present embodiment includes an engine main body 2 and an exhaust gas post-processing device 3. The engine main body 2 discharges gas burned in the inside thereof as exhaust gas. The engine main body 2 of the present embodiment is a diesel engine. In FIGS. 1 to 7, a vertical direction is defined as a Z-axis direction. Further, a first horizontal direction orthogonal to the Z-axis direction is defined as an X-axis direction. Further, a second horizontal direction orthogonal to the Z-axis direction and the X-axis direction is defined as a Y-axis direction.

Exhaust Gas Post-Processing Device

As shown in FIGS. 1 to 3, the exhaust gas post-processing device 3 includes an exhaust gas post-processing unit 4, a drain pipe 5, a junction member 6, and a drainage pipe 7.

Exhaust Gas Post-Processing Unit

As shown in FIG. 1, the exhaust gas discharged from the engine main body 2 is introduced into the exhaust gas post-processing unit 4. The exhaust gas post-processing unit 4 of the present embodiment is a diesel-particulate filter (DPF) for collecting particulate matter contained in the exhaust gas.

The exhaust gas post-processing unit 4 has a cylindrical appearance. An introduction port (not shown) for introducing the exhaust gas into the exhaust gas post-processing unit 4 is formed at a first end 11 of the exhaust gas post-processing unit 4 in a longitudinal direction. A discharge pipe 13 for discharging the exhaust gas to an outside is connected to a second end 12 of the exhaust gas post-processing unit 4. The discharge pipe 13 extends in a radial direction with respect to the exhaust gas post-processing unit 4.

The exhaust gas post-processing unit 4 is arranged on an upper side of the engine main body 2 so that the longitudinal direction of the exhaust gas post-processing unit 4 is oriented in the second horizontal direction (Y-axis direction). The discharge pipe 13 extends upward (in the positive Z-axis direction) with respect to the exhaust gas post-processing unit 4.

The exhaust gas is introduced into the first end 11 of the exhaust gas post-processing unit 4 and is purified by flowing from the first end 11 of the exhaust gas post-processing unit 4 toward the second end 12, in the inside of the exhaust gas post-processing unit 4. Thereafter, the exhaust gas that has reached the second end 12 of the exhaust gas post-processing unit 4 is discharged to the outside through the discharge pipe 13.

The exhaust gas post-processing device 3 of the present embodiment includes two exhaust gas post-processing units 4 described above. The two exhaust gas post-processing units 4 are arranged at intervals in the first horizontal direction (X-axis direction). In FIG. 3, the longitudinal direction of the two exhaust gas post-processing units 4 is parallel to each other, but the present invention is not limited thereto.

Support Portion

As shown in FIGS. 1 to 3, the exhaust gas post-processing device 3 further includes a support portion 8 that supports the two exhaust gas post-processing units 4. The support portion 8 includes a support plate 15 and a support base 16. The support plate 15 is placed on an upper surface of the engine main body 2 and is detachably fixed to the engine main body 2 by a fixing member (not shown) such as a bolt. The support base 16 is integrally provided on an upper surface of the support plate 15. A plurality of (two) support bases 16 are provided to the same exhaust gas post-processing unit 4. The exhaust gas post-processing unit 4 is fixed to the support portion 8 in a state of being placed on the support base 16.

Drain Pipe

As shown in FIGS. 1 to 3, the drain pipe 5 is connected to a lower portion of each of the exhaust gas post-processing units 4. The drain pipe 5 is located at the second end 12 of the exhaust gas post-processing unit 4, as the same as the discharge pipe 13 described above. The drain pipe 5 extends downward (in the negative Z-axis direction) from the exhaust gas post-processing unit 4. The drain pipe 5 is a metallic pipe made of stainless steel or the like.

As shown in FIGS. 2 and 3, in the present embodiment, two connecting portions each connecting one of two exhaust gas post-processing units 4 and the corresponding one of two drain pipes 5 are arranged at a distance from each other in the first horizontal direction (X-axis direction).

Junction Member

As shown in FIGS. 1 to 3, the junction member 6 relays the drain pipe 5 described above and the drainage pipe 7 to be described later. In other words, the drain pipe 5 and the drainage pipe 7 are connected to the junction member 6. The junction member 6 is a metallic member made of stainless steel or the like. As shown in FIGS. 4 to 7, the junction member 6 has an introduction flow path 20 and a discharge flow path 30.

Figure 4:
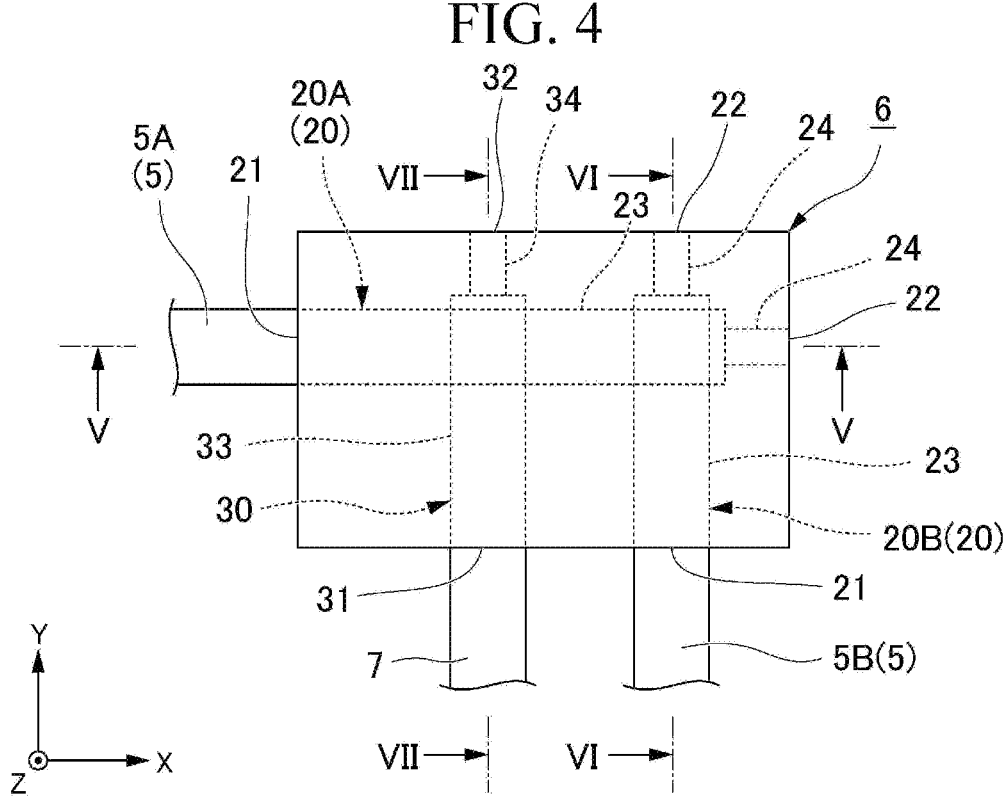
FIG. 4 is an enlarged top view showing a junction member of FIGS. 1 to 3.

The introduction flow path 20 extends in a horizontal direction (a direction orthogonal to the Z-axis direction). In the present embodiment, the introduction flow path 20 extends without inclination in the vertical direction (Z-axis direction) with respect to the horizontal direction. Also, the introduction flow path 20 of the present embodiment extends linearly. In addition, the introduction flow path 20 may be curved, for example. As shown in FIG. 4, one end of the introduction flow path 20 in the extending direction is an introduction port 21 connected to the drain pipe 5. The other end of each introduction flow path 20 is an introduction-side gas vent hole 22 which opens to the outside of the junction member 6.

Specifically, the introduction flow path 20 includes a main introduction flow path 23 and an introduction-side gas vent flow path 24. The main introduction flow path 23 includes the introduction port 21. The main introduction flow path 23 is connected to a discharge flow path 30, which will be described later. The introduction-side gas vent flow path 24 includes an introduction-side gas vent hole 22. The introduction-side gas vent flow path 24 is connected to the main introduction flow path 23. A flow path cross-sectional area orthogonal to the introduction-side gas vent flow path 24 provided in the extension direction of the introduction flow path 20 is smaller than the flow path cross-sectional area of the main introduction flow path 23 (see, particularly, FIGS. 5 to 7).

Figure 5:
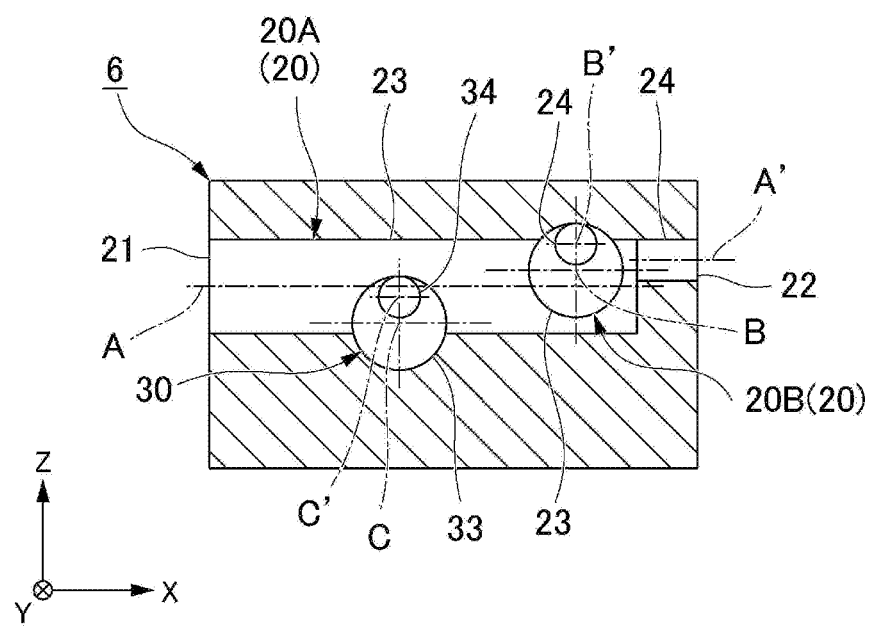
FIG. 5 is a cross-sectional view taken along the line V-V of FIG. 4.
Figure 6:
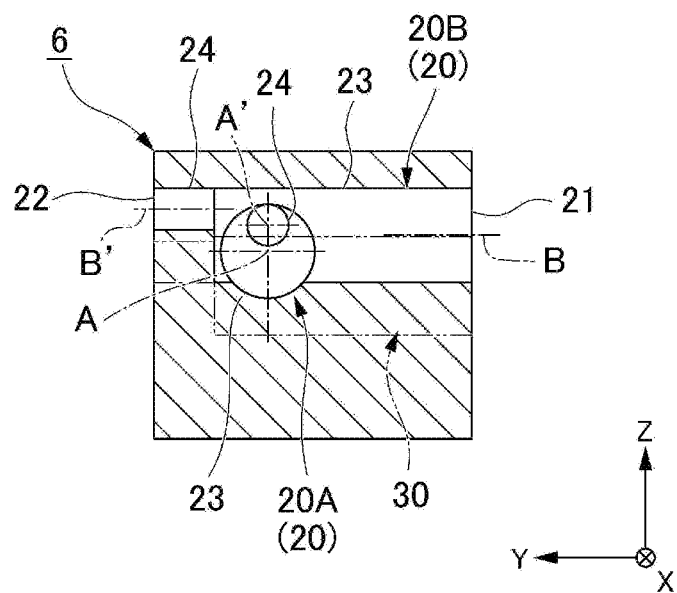
FIG. 6 is a cross-sectional view taken along line VI-VI of FIG. 4.

As shown in FIGS. 5 and 6, the main introduction flow path 23 of the present embodiment extends without inclination in the vertical direction (Z-axis direction) with respect to the horizontal direction. Also, in the same way as the main introduction flow path 23, the introduction-side gas discharge flow path 24 of the present embodiment extends without inclination in the vertical direction with respect to the horizontal direction. In addition, for example, the introduction-side gas vent flow path 24 may extend so as to incline upward (in the positive Z-axis direction) toward the introduction-side gas vent hole 22 from a connection portion with the main introduction flow path 23.

In the present embodiment, the shape of the flow path cross section of the main introduction flow path 23 and the introduction-side gas vent flow path 24 is a circular shape. In addition, the shape of the flow path cross section of the main introduction flow path 23 and the introduction-side gas vent flow path 24 is not limited to a circular shape, and may be any arbitrary shape.

Figure 7:
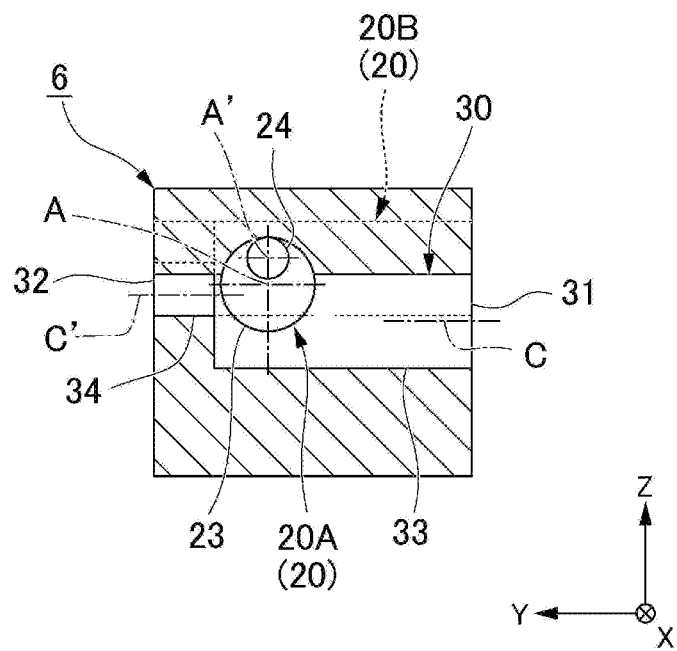
FIG. 7 is a cross-sectional view taken along line VII-VII of FIG. 4.

The introduction-side gas vent flow path 24 is located at the upper portion of the main introduction flow path 23. Specifically, as shown in FIGS. 5 to 7, central axes A' and B' of the introduction-side gas vent flow path 24 are located above central axes A and B of the main introduction flow path 23 (in the positive Z-axis direction) when viewed from the extension direction of the introduction flow path 20. As seen from an extension direction of the introduction flow path 20, at least part of a connection portion of the introduction-side gas vent flow path 24 to the main introduction flow path 23 is to be overlapped with an upper portion of the main introduction flow path 23. In the present embodiment, the whole of the connecting portion of the introduction-side gas vent flow path 24 connected to the main introduction flow path 23 overlaps with the upper portion of the main introduction flow path 23.

As shown in FIGS. 4 to 6, in the junction member 6 of the present embodiment, two introduction flow paths 20 as described above are formed. The two introduction flow paths 20 (20A, 20B) respectively correspond to two exhaust gas post-processing units 4 (see FIGS. 2 and 3). The two introduction flow paths 20 intersect each other. In other words, the two introduction flow paths 20 are connected to each other. Also, the two introduction flow paths 20 are arranged in the vertical direction (Z-axis direction).

Specifically, the first introduction flow path 20A extends in the first horizontal direction (X-axis direction). On the other hand, the second introduction flow path 20B extends in the second horizontal direction (Y-axis direction). That is, the two introduction flow paths 20A and 20B are orthogonal to each other. Also, the main introduction flow path 23 of the two introduction flow paths 20A and 20B intersects with each other. Thus, the two introduction flow paths 20A and 20B are connected to each other.

As shown in FIGS. 5 and 6, the main introduction flow path 23 of the first introduction flow path 20A is connected to the lower portion of the main introduction flow path 23 of the second introduction flow path 20B. In other words, the central axis A of the main introduction flow path 23 of the first introduction flow path 20A is located below (in the negative Z-axis direction) the central axis B of the main introduction flow path 23 of the second introduction flow path 20B.

Also, in the present embodiment, as shown in FIG. 5, part of the introduction-side gas vent flow path 24 of the second introduction flow path 20B overlaps with the first introduction flow path 20A in the vertical direction (Z-axis direction). In addition, the entire introduction-side gas vent flow path 24 of the second introduction flow path 20B in the vertical direction does not need to be overlapped with the first introduction flow path 20A. In other words, the introduction-side gas vent flow path 24 of the second introduction flow path 20B may be located above (in the positive Z-axis direction) the first introduction flow path 20A at a distance therefrom.

As shown in FIGS. 4, 5, and 7, the discharge flow path 30 extends horizontally as the same as the introduction flow path 20. In the present embodiment, the discharge flow path 30 extends without inclination in the vertical direction (Z-axis direction) with respect to the horizontal direction. In addition, the discharge flow path 30 of the present embodiment extends linearly as the same as the introduction flow path 20.

As shown in FIG. 4, one end portion of the discharge flow path 30 in the extending direction is a discharge port 31 that opens to the outside of the junction member 6. The drainage pipe 7, which will be described later, is connected to the discharge port 31.

The other end portion of the discharge flow path 30 (the end portion of the discharge flow path 30 located on the opposite side of the discharge port 31) is a discharge-side gas vent hole 32 that opens to the outside of the junction member 6.

Specifically, the discharge flow path 30 includes a main discharge flow path 33 and a discharge-side gas vent flow path 34. The main discharge flow path 33 includes the discharge port 31. The main discharge flow path 33 is connected to the first introduction flow path 20A. The discharge-side gas vent flow path 34 includes the discharge-side gas vent hole 32. The discharge-side gas vent flow path 34 is connected to the main discharge flow path 33. The flow path cross-sectional area orthogonal to the discharge-side gas vent flow path 34 provided in the extension direction of the discharge flow path 30 is smaller than the flow path cross-sectional area of the main discharge flow path 33 (see, particularly, FIG. 5).

As shown in FIG. 7, the main discharge flow path 33 of the present embodiment extends without inclination in the vertical direction (Z-axis direction) with respect to the horizontal direction. As the same as the main discharge flow path 33, the discharge-side gas vent flow path 34 of the present embodiment extends without inclination in the vertical direction with respect to the horizontal direction. In addition, for example, the discharge-side gas vent flow path 34 may extend so as to incline upward (in a positive Z-axis direction) toward the discharge-side gas vent hole 32 from a connection portion to the main discharge flow path 33.

As shown in FIG. 5, in the present embodiment, the shape of the flow path cross section of the main discharge flow path 33 and the discharge-side gas vent flow path 34 is a circular shape. In addition, the shape of the flow path cross section of the main discharge flow path 33 and the discharge-side gas vent flow path 34 is not limited to a circular shape and may be any arbitrary shape.

The discharge-side gas vent flow path 34 is located at the upper portion of the main discharge flow path 33. Specifically, when viewed from the extending direction of the discharge flow path 30, the central axis C' of the discharge-side gas vent flow path 34 is located above (in the positive direction of the Z-axis) the central axis C of the main discharge flow path 33.

When viewed from the extending direction of the discharge flow path 30, at least part of the connection portion of the discharge-side gas vent flow path 34 to the main discharge flow path 33 is to be overlapped with the upper portion of the main discharge flow path 33. In the present embodiment, the whole of the portion of the discharge-side gas vent flow path 34 connected to the main discharge flow path 33 overlaps with the upper portion of the main discharge flow path 33.

As shown in FIG. 4, the discharge flow path 30 extends in a direction intersecting with the first introduction flow path 20A in the horizontal direction. Specifically, the discharge flow path 30 extends in the second horizontal direction (Y-axis direction). In other words, the discharge flow path 30 is orthogonal to the first introduction flow path 20A and is parallel to the second introduction flow path 20B.

As shown in FIGS. 4, 5, and 7, the discharge flow path 30 is connected to the lower portion of the first introduction flow path 20A. Specifically, the main discharge flow path 33 of the discharge flow path 30 is connected to the lower portion of the main introduction flow path 23 of the first introduction flow path 20A. In other words, the central axis C of the main discharge flow path 33 of the discharge flow path 30 is located below (in the negative Z-axis direction) the central axis A of the main introduction flow path 23 of the first introduction flow path 20A. Thus, in the present embodiment, the second introduction flow path 20B, the first introduction flow path 20A, and the discharge flow path 30 are arranged downward in this order. Further, the second introduction flow path 20B is connected to the discharge flow path 30 via the first introduction flow path 20A.

Further, in the present embodiment, as shown in FIG. 7, part of the introduction-side gas vent flow path 24 of the first introduction flow path 20A overlaps with the discharge flow path 30 in the vertical direction (Z-axis direction). In addition, the entire introduction-side gas vent flow path 24 of the first introduction flow path 20A in the vertical direction does not need to be overlapped with the discharge vertical direction 30. In other words, the introduction-side gas vent flow path 24 of the first introduction flow path 20A may be located above the discharge flow path 30 (in the positive Z-axis direction) at a distance therefrom.

As shown in FIGS. 4 and 5, the discharge flow path 30 and the second introduction flow path 20B are arranged at a distance from each other in the extending direction of the first introduction flow path 20A. Specifically, the discharge flow path 30 and the second introduction flow path 20B are arranged in this order in a direction from the introduction port 21 of the first introduction flow path 20A toward the introduction-side gas vent hole 22 in the extending direction of the first introduction flow path 20A. In addition, the arrangement order of the discharge flow path 30 and the second introduction flow path 20B in the extending direction of the first introduction flow path 20A may be reversed. Further, in the present embodiment, a direction from the discharge port 31 toward the discharge port 32 in the discharge flow path 30 coincides with a direction from the introduction port 21 to the introduction port 22 in the second introduction flow path 20B. In other words, the discharge flow path 30 is oriented in the same direction as the second introduction flow path 20B. Note that the discharge flow path 30 may be directed in a direction opposite to that of the second introduction flow path 20B, for example.

As shown in FIGS. 1 and 2, the junction member 6 configured as described above is positioned at a distance from below (in the negative Z-axis direction) the exhaust gas post-processing unit 4 in the vertical direction. For this reason, the drain pipe 5 extends downward from the exhaust gas post-processing unit 4 to the junction member 6. Further, as shown in FIGS. 2 and 3, the junction member 6 is located between the two exhaust gas post-processing units 4. Specifically, the junction member 6, in the first horizontal direction (X-axis direction), is located in the middle of the two connecting portions, each connecting portion connecting the one of the two exhaust gas post-processing units 4 and the corresponding one of the two drain pipes 5. Further, as shown in FIGS. 1 and 3, the junction member 6, in the second horizontal direction (the Y-axis direction), is positioned closer to the first end 11 side of the exhaust gas post-processing unit 4 than the connection portion (the second end 12 of the exhaust gas post-processing unit 4) between the exhaust gas post-processing unit 4 and the drain pipe 5. Thus, each of the two drain pipe 5 also extends in the first horizontal direction and in the second horizontal direction. Specifically, as shown in FIG. 2, part of each drain pipe 5 extends obliquely downward from each exhaust gas post-processing unit 4.

Further, as shown in FIGS. 3 and 4, the junction member 6 is arranged such that the introduction port 21 of the first introduction flow path 20A faces one exhaust gas post-processing unit 4A, and such that the introduction port 21 of the second introduction flow path 20 and the discharge port 31 of the discharge flow path 30 face the second end 12 of the exhaust gas post-processing unit 4 in the second horizontal direction.

A first drain flow path 5A extending from the one exhaust gas post-processing unit 4A is connected to a first introduction flow path 20A of the junction member 6. Further, a second drain pipe 5B extending from the other exhaust gas post-processing unit 4B is connected to the second introduction flow path 20B.

Further, as shown in FIGS. 1 and 2, the junction member 6 is fixed to the upper surface of the support plate 15.

Drainage Pipe

As shown in FIGS. 1 to 4, the drainage pipe 7 is connected to the discharge port 31 of the junction member 6. The drainage pipe 7 extends downward (in the negative Z-axis direction) from the junction member 6. As shown in FIGS. 1 to 3, the drainage pipe 7 includes three portions 41, 42, 43. The first and second portions 41, 42 of the drainage pipe 7 are located on an upper side of the engine main body 2.

The first portion 41 of the drainage pipe 7 extends in the direction in which the discharge port 31 of the junction member 6 faces (the negative Y-axis direction direction) in the second horizontal direction from the junction member 6. Although not shown in the drawing, the first portion 41 of the drainage pipe 7 extends so as to incline downward from the junction member 6 toward the second horizontal direction.

The second portion 42 of the drainage pipe 7 extends from the tip of the first portion 41 to one side (X-axis positive direction side) of the arrangement direction of the two exhaust gas post-processing units 4 with respect to the junction member 6 and reaches the side portion of the engine main body 2 in the first horizontal direction. Further, the second portion 42 of the drainage pipe 7 extends so as to incline downward from the tip of the first portion 41 toward the first horizontal direction.

Further, as shown in FIG. 3, the second portion 42 of the drainage pipe 7 is bent at an intermediate portion of the longitudinal direction thereof. The base end portion of the second portion 42 located closer to the first portion 41 than the bent portion extends without inclination in the second horizontal direction with respect to the first horizontal direction. On the other hand, the tip portion of the second portion 42 located closer to the side portion side of the engine main body 2 than the bent portion extends so as to incline in the second horizontal direction with respect to the first horizontal direction.

As shown in FIGS. 1 and 2, a third portion 43 of the drainage pipe 7 is located on a side portion of the engine main body 2. The third portion 43 extends downward from a tip of the second portion 42 to a lower end of the engine main body 2. The third portion 43 of the drainage pipe 7 is detachably fixed to the side portion of the engine main body 2.

The drainage pipe 7 is made of a metal pipe mainly made of stainless steel or the like. However, as shown in FIGS. 1 to 3, part of the drainage pipe 7 is constituted by an elastic pipe 44 made of an elastically bendable material such as silicone rubber. In the present embodiment, a tip portion of the second portion 42 of the drainage pipe 7 is constituted by an elastic pipe 44. In the present embodiment, the elastic pipe 44 extends linearly. In addition, the elastic pipe 44 may be slightly bent.

Operation and Effects

In the exhaust gas post-processing device 3 of the present embodiment, the moisture entering each exhaust gas post-processing unit 4 flows into each introduction flow path 20 of the junction member 6 shown in FIGS. 4 to 7 via each drain pipe 5. The moisture that has flowed into the first introduction flow path 20 flows in a lower portion of the first introduction flow path 20A due to its own weight and flows into the discharge flow path 30 that is connected to the lower portion of the first introduction flow path 20A. On the other hand, the water that has flowed into the second introduction flow path 20B flows in a lower portion of the second introduction flow path 20B due to its own weight, and flows into the discharge flow path 30 via the first introduction flow path 20A that is connected to the lower portion of the second introduction flow path 20B. Therefore, it is possible to prevent moisture that has flowed into each introduction flow path 20 from flowing into the introduction-side gas vent flow path 24 of each introduction flow path 20A and being discharged from the introduction-side gas vent hole 22 to the outside of the junction member 6.

The moisture flowing into the discharge flow path 30 flows from the junction member 6 into the drainage pipe 7 through the discharge port 31 of the discharge flow path 30, flows through the inside portion of the drainage pipe 7 by its own weight and is discharged from the drain port of the drainage pipe 7 located on the lower end side of the engine main body 2 shown in FIGS. 1 to 3.

In addition, in the exhaust gas post-processing device 3 of the present embodiment, there is a case in which part of the exhaust gas discharged from the engine main body 2 to each of the exhaust gas post-processing units 4 flows into each of the introduction flow paths 20 of the junction member 6 shown in FIGS. 4 to 7 via each of the drain pipes 5. Here, the flow velocity of the exhaust gas flowing in each of the drain pipes 5 and the introduction flow paths 20 is higher than the flow velocity of the moisture. Therefore, the exhaust gas easily proceeds in the extending direction of each introduction flow path 20 in comparison with moisture. Thus, the exhaust gas flowing into each introduction flow path 20 is discharged to the outside of the junction member 6 preferentially from the introduction-side gas vent hole 22 of each introduction flow path 20.

Also, exhaust gas easily flows in the upper portion of each introduction flow path 20. Therefore, it is possible to prevent the exhaust gas from flowing from the second introduction flow path 20B into the first introduction flow path 20A connected to the lower portion of the second introduction flow path 20B or flowing from the first introduction flow path 20A into the discharge flow path 30 connected to the lower portion of the first introduction flow path 20A.

From the above, it is possible to suppress the exhaust gas from flowing into the drainage pipe 7 from the junction member 6.

In the engine 1 of the present embodiment shown in FIGS. 1 to 3, in order to perform maintenance and inspection of the exhaust gas post-processing device 3 (in particular, the exhaust gas post-processing unit 4), there is a case in which the exhaust gas post-processing device 3 is attached and detached to and from the engine main body 2.

When the exhaust gas post-processing device 3 is detached from the engine main body 2, the fixing state of the support plate 15 and the third portion 43 of the drainage pipe 7 with respect to the engine main body 2 only have to be released. Also, when the exhaust gas post-processing device 3 is attached to the engine main body 2, the support plate 15 of the exhaust gas post-processing device 3 only have to be fixed to the upper surface of the engine main body 2 and the third portion 43 of the drainage pipe 7 only have to be fixed to the side portion of the engine main body 2.

The exhaust gas post-processing unit 4 and the junction member 6 are fixed to the support portion 8 including the support plate 15. Therefore, the exhaust gas post-processing unit 4, the drain exhaust gas 5, the junction member 6, and the drainage pipe 7 (excluding the third portion 43) which constitute the exhaust gas post-processing device 3 can be collectively attached and detached easily to and from the engine main body 2.

The support plate 15 and the third portion 43 of the drainage pipe 7 are fixed to different portions of the engine main body 2. Therefore, when the exhaust gas post-processing device 3 is attached to the engine main body 2, it is necessary to adjust the relative positions of the support plate 15 and the third portion 43 of the drainage pipe 7.

On the other hand, in the exhaust gas post-processing device 3 of the present embodiment, part of the drainage pipe 7 (particularly, part closer to the junction member 6 than the third part 43) is formed of an elastic pipe 44. Thus, when the exhaust gas post-processing device 3 is attached to the engine main body 2, the elastic pipe 44 is elastically displaced, so that the relative positions of the support plate 15 and the third portion 43 of the drainage pipe 7 can be easily adjusted.

As described above, according to the exhaust gas post-processing device 3 related to the present embodiment and the engine 1 provided the same, one end of each introduction flow path 20 in the extension direction is set as the introduction port 21 connected to the drain pipe 5, and as shown in FIGS. 4 to 7, the other end of each introduction flow path 20 is set as the introduction-side gas vent hole 22. Therefore, the exhaust gas can be preferentially discharged from the introducing-side gas vent hole 22 of each introduction flow path 20 to the outside of the junction member 6. In addition, the discharge flow path 30 is connected to a lower portion of the first introduction flow path 20A. Further, the first introduction flow path 20A is connected to the lower portion of the second introduction flow path 20B. Therefore, it is possible to prevent the exhaust gas from flowing into the discharge flow path 30 from the introduction flow path 20.

As a result, it is possible to suppress the exhaust gas from flowing into the drainage pipe 7 from the junction member 6 and to suppress the deterioration of the drainage pipe 7 due to the heat of the exhaust gas. In particular, deterioration of the elastic pipe 44 which is weak in heat of the drainage pipe 7 can be suppressed.

In addition, in the exhaust gas post-processing device 3 of the present embodiment, the flow path cross-sectional area of the introduction-side gas vent flow path 24 of each introduction flow path 20 is smaller than the flow path cross-sectional area of the main introduction flow path 23. Therefore, moisture having a large viscous resistance does not easily pass through the introduction-side gas vent flow path 24 rather than the exhaust gas having a small viscous resistance. Accordingly, it is possible to prevent moisture from being discharged from the introduction-side gas vent hole 22 to the outside of the junction member 6. In other words, moisture in the introduction flow path 20 can be efficiently guided to the discharge flow path 30.

On the other hand, the viscous resistance of the exhaust gas is smaller than the viscous resistance of the water. Therefore, even if the flow path cross-sectional area of the introduction-side gas vent flow path 24 is smaller than the flow path cross-sectional area of the main introduction flow path 23, the exhaust gas can be discharged to the outside of the junction member 6 through the introduction-side gas vent flow path 24.

In addition, in the exhaust gas post-processing device 3 of the present embodiment, the introduction-side gas vent flow path 24 of each introduction flow path 20 is located at the upper portion of the main introduction flow path 23. Therefore, the exhaust gas easily flowing in the upper portion of each introduction flow path 20 easily flows from the main introduction flow path 23 into the introduction-side gas vent flow path 24. Accordingly, it is possible to more efficiently discharge the exhaust gas from the introduction-side gas vent hole 22 to the outside of the junction member 6. On the other hand, moisture easily flowing in the lower portion of each introduction flow path 20 due to its own weight hardly flows from the main introduction flow path 23 into the introduction-side gas vent flow path 24. Therefore, it is further possible to prevent moisture from being discharged from the introduction-side gas vent hole 22 to the outside of the junction member 6. In other words, moisture in the introduction flow path 20 can be more efficiently guided to the discharge flow path 30.

In addition, in the exhaust gas post-processing device 3 of the present embodiment, one end portion of the discharge flow path 30 in the extension direction is set as an discharge port 31 connected to the drainage pipe 7, and the other end portion of the discharge flow path 30 in the extension direction is set as a discharge-side gas vent hole 32. Therefore, even if the exhaust gas enters the discharge flow path 30 from the first introduction flow path 20A, it is possible to discharge the exhaust gas from the discharge-side gas vent hole 32 to the outside of the junction member 6. Accordingly, it is also possible to prevent the exhaust gas from flowing into the drainage pipe 7 from the junction member 6.

In addition, in the exhaust gas post-processing device 3 of the present embodiment, the flow path cross-sectional area of the discharge-side gas vent flow path 34 of the discharge flow path 30 is smaller than the flow path cross-sectional-area of the main discharge flow path 33. Therefore, moisture having a large viscous resistance does not easily pass through the discharge-side gas vent flow path 34 rather than the exhaust gas having a small viscous resistance. Thus, it is possible to prevent moisture entering into the discharge flow path 30 from being discharged from the discharge-side gas vent hole 32 to the outside of the junction member 6. In other words, moisture in the discharge flow path 30 can be efficiently guided to the drainage pipe 7.

On the other hand, the viscous resistance of the exhaust gas is smaller than the viscous resistance of the moisture. Therefore, even if the flow path cross-sectional area of the discharge-side gas vent flow path 34 is smaller than the flow path cross-sectional area of the main discharge flow path 33, the exhaust gas can be discharged to the outside of the junction member 6 through the discharge-side gas vent flow path 34.

In addition, in the exhaust gas post-processing device 3 of the present embodiment, the discharge-side gas vent flow path 34 of the discharge flow path 30 is located at the upper portion of the main discharge flow path 33. Therefore, the exhaust gas which is easily flowed in the upper portion of the discharge flow path 30 easily flows from the main discharge flow path 33 into the discharge-side gas vent flow path 34. Accordingly, it is possible to more efficiently discharge the exhaust gas from the discharge-side gas vent hole 32 to the outside of the junction member 6. On the other hand, moisture that easily flows in the lower portion of the discharge flow path 30 due to its own weight hardly flows from the main discharge flow path 33 into the discharge-side gas vent flow path 34. Therefore, it is also possible to prevent moisture from being discharged from the discharge-side gas vent hole 32 to the outside of the junction member 6. In other words, the moisture in the discharge flow path 30 can be more efficiently guided to the drainage pipe 7.

In addition, in the exhaust gas post-processing device 3 of the present embodiment, the junction member 6 has the plurality of introduction flow path 20 that respectively corresponds to the plurality of exhaust gas post-processing units 4. Therefore, the moisture discharged from each of the plurality of exhaust gas post-processing units 4 can be collected in the junction member 6 and then allowed to flow into the drainage pipe 7.

In addition, in the exhaust gas post-processing device 3 of the present embodiment, the junction member 6 is located between the two exhaust gas post-processing units 4 arranged horizontally. Further, the drainage pipe 7 extends to one side of the arrangement direction of the two exhaust gas post-processing units 4 with respect to the junction member 6. Thus, it is possible to reduce the difference in length between the two drain pipes 5 extending from the two exhaust gas post-processing units 4 to the junction member 6. Thus, even if part of the drainage pipe 7 is constituted by the elastic pipe 44 which is weak in heat, at a location away from the junction member 6, a flow path length from each exhaust gas post-processing unit 4 to the elastic pipe 44 can be sufficiently secured. Accordingly, even if the exhaust gas flows into the drainage pipe 7, it is possible to cool the exhaust gas until reaching the elastic pipe 44 and to reduce the influence of the heat of exhaust gas on the elastic pipe 44. The exhaust gas can be efficiently cooled at a portion made of the metallic pipe among the drain pipe 5, the junction member 6, and the drainage pipe 7 which are made of metal.

In addition, in the exhaust gas post-processing device 3 of the present embodiment, the plurality of introduction flow paths 20 intersect each other and are arranged in the vertical direction.

By the plurality of introduction flow path 20 intersecting each other, it is possible to freely set the locations of the plurality of introduction ports 21 in the junction member 6. Thus, it is possible to improve the degree of freedom in arrangement of the exhaust gas post-processing units 4 and the drain pipes 5 with respect to the junction member 6. In other words, it is possible to improve the degree of freedom in design of the exhaust gas post-processing device 3.

Further, since the plurality of introduction flow paths 20 are located so as to be displaced from each other in the vertical direction, the flow of the exhaust gas flowing from the introduction port 21 toward the introduction-side gas vent hole 22 at each of the plurality of introduction flow paths 20 can be prevented from colliding and disturbing at the intersection of the plurality of introduction flow paths 20. Thus, the exhaust gas can be efficiently discharged from the introduction-side gas vent hole 22 of each introduction flow path 20 to the outside of the junction member 6.

In addition, in the exhaust gas post-processing device 3 of the present embodiment, the elastic pipe 44 constituting the drainage pipe 7 extends linearly. Therefore, even if the exhaust gas passes through the elastic pipe 44, it is possible to suppress the deviation of the thinning of the elastic pipe 44. This point will be described in detail below.

For example, if the elastic pipe 44 is bent, the flow velocity of the exhaust gas in an outer region of the flow path of the curved elastic pipe 44 is larger than the flow velocity of the exhaust gas in an inner region. Therefore, a wall thickness of a portion corresponding to the above-mentioned outer region of the pipe wall of the elastic pipe 44 becomes easily thinner than a wall thickness of a portion corresponding to the inner region by the heat of the exhaust gas. In other words, there is an imbalance in thinning of the pipe wall of the elastic pipe 44 based on the heat of the exhaust gas.

On the other hand, when the elastic pipe 44 extends linearly, it is possible to equalize the flow velocity of the exhaust gas in the flow path of the elastic pipe 44. Thus, it is possible to suppress the deviation of the thinning of the elastic pipe 44 and to extend the service life of the elastic pipe 44.

Other Embodiment

Although an embodiment of the present invention has been described as above, the present invention is not limited thereto and can be appropriately changed without departing from the technical idea of the present invention.

In the exhaust gas post-processing device of the present invention, a plurality of introduction flow paths 20 formed in the junction member 6 do not have to intersect each other, for example. For example, as shown in FIGS. 8 to 11, two introduction flow paths 20 may be parallel to each other. In this case, each of the two introduction flow paths 20 only has to intersect with the discharge flow path 30. In other words, two introduction flow paths 20 may be respectively connected to the discharge flow path 30. In this case, the discharge flow path 30 only have to be connected to the lower portion of each introduction flow path 20. The two introduction flow paths 20 may be located so as to be displaced from each other in the vertical direction (Z-axis direction), or may be disposed at the same location as each other.

Figure 8:
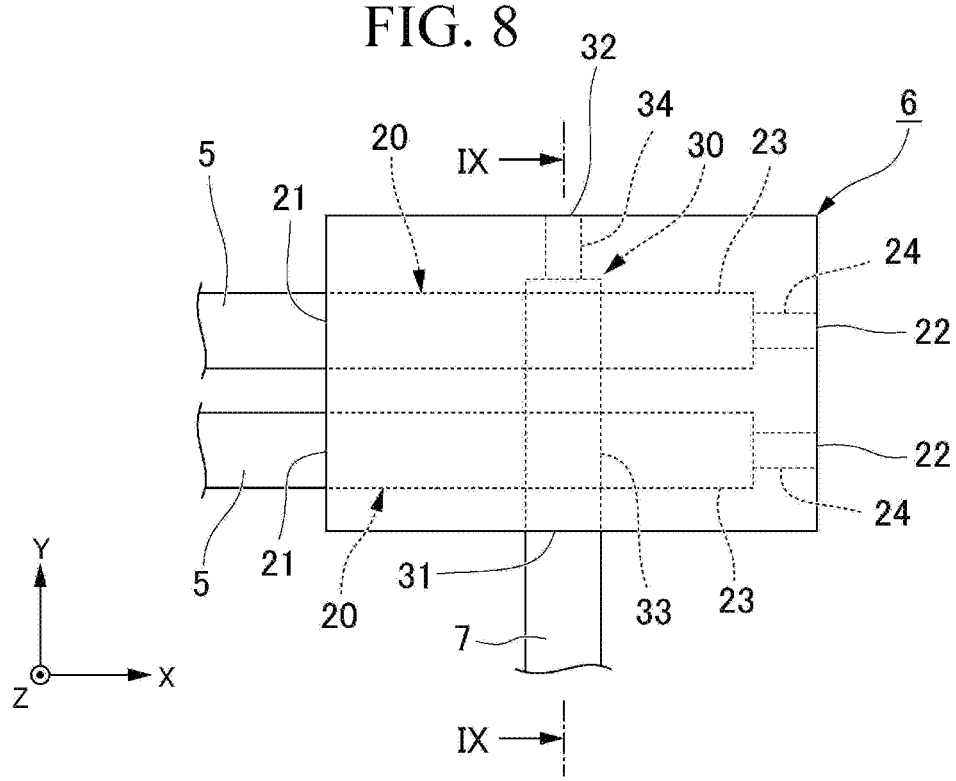
FIG. 8 is a top view showing a first modification of the junction member.
Figure 9:
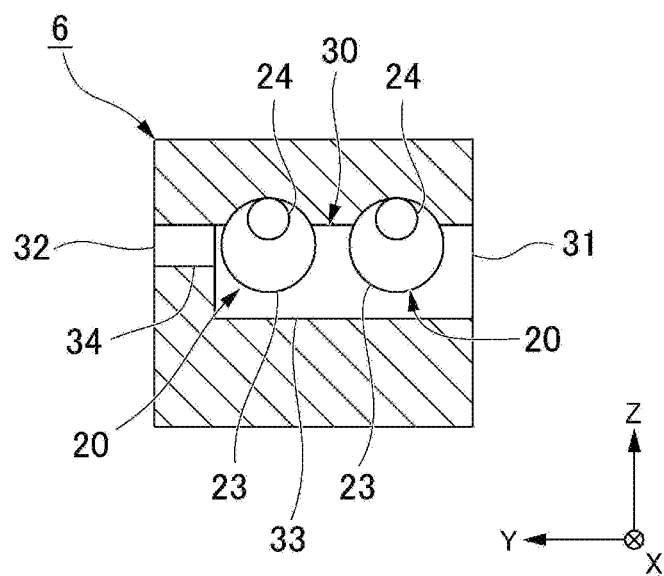
FIG. 9 is a cross-sectional view taken along the line IX-IX of FIG. 8.
Figure 10:
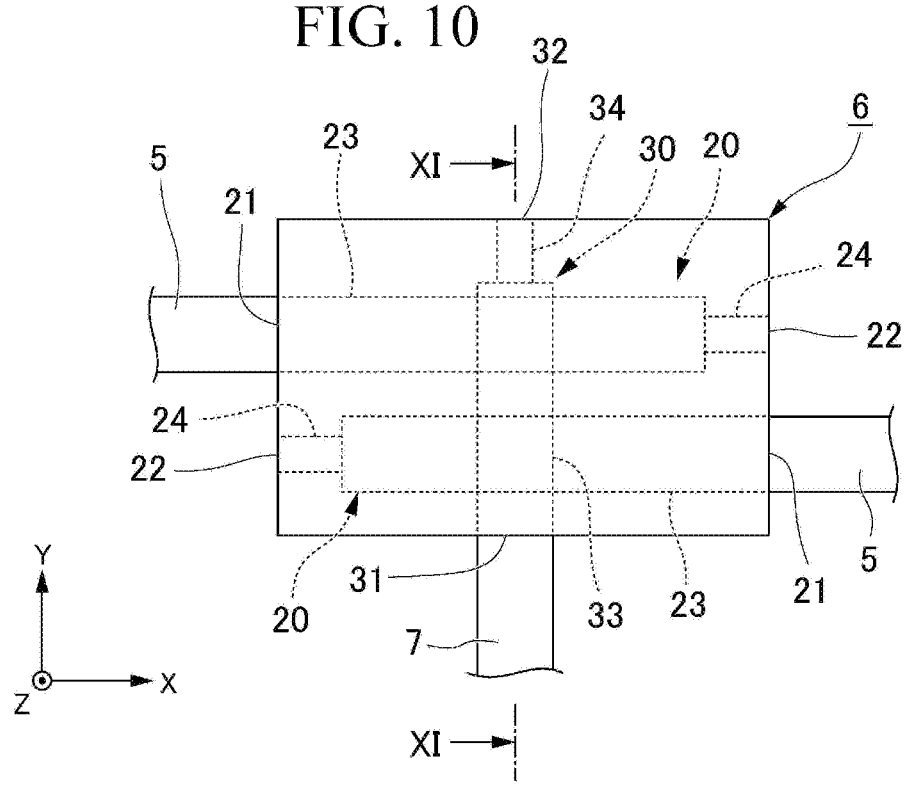
FIG. 10 is a top view showing a second modification of the junction member.
Figure 11:
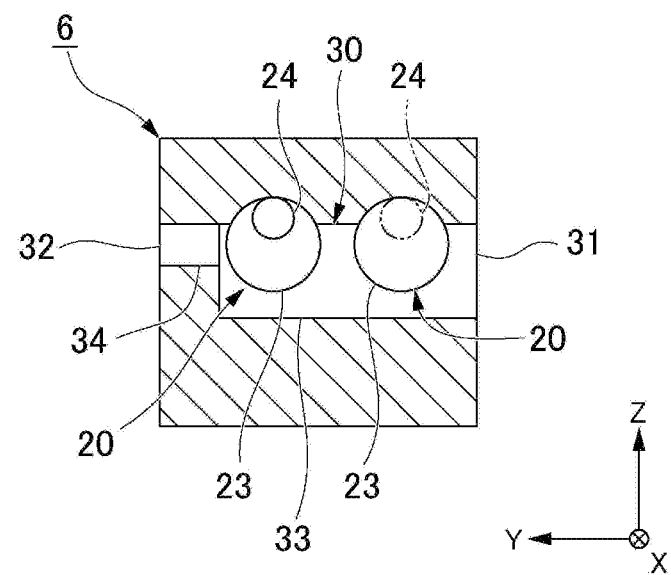
FIG. 11 is a cross-sectional view taken along the line XI-XI of FIG. 10.

As shown in FIGS. 8 and 9, the two introduction flow paths 20 which are parallel to each other may be disposed in a manner such that the direction from the introduction port 21 toward the introduction-side gas vent hole 22 is the same as each other. Further, for example as shown in FIGS. 10 and 11, the two introduction flow paths 20 may be disposed in a manner such that the direction from the introduction port 21 toward the introduction-side gas vent hole 22 is opposite to each other.

Figure 12:
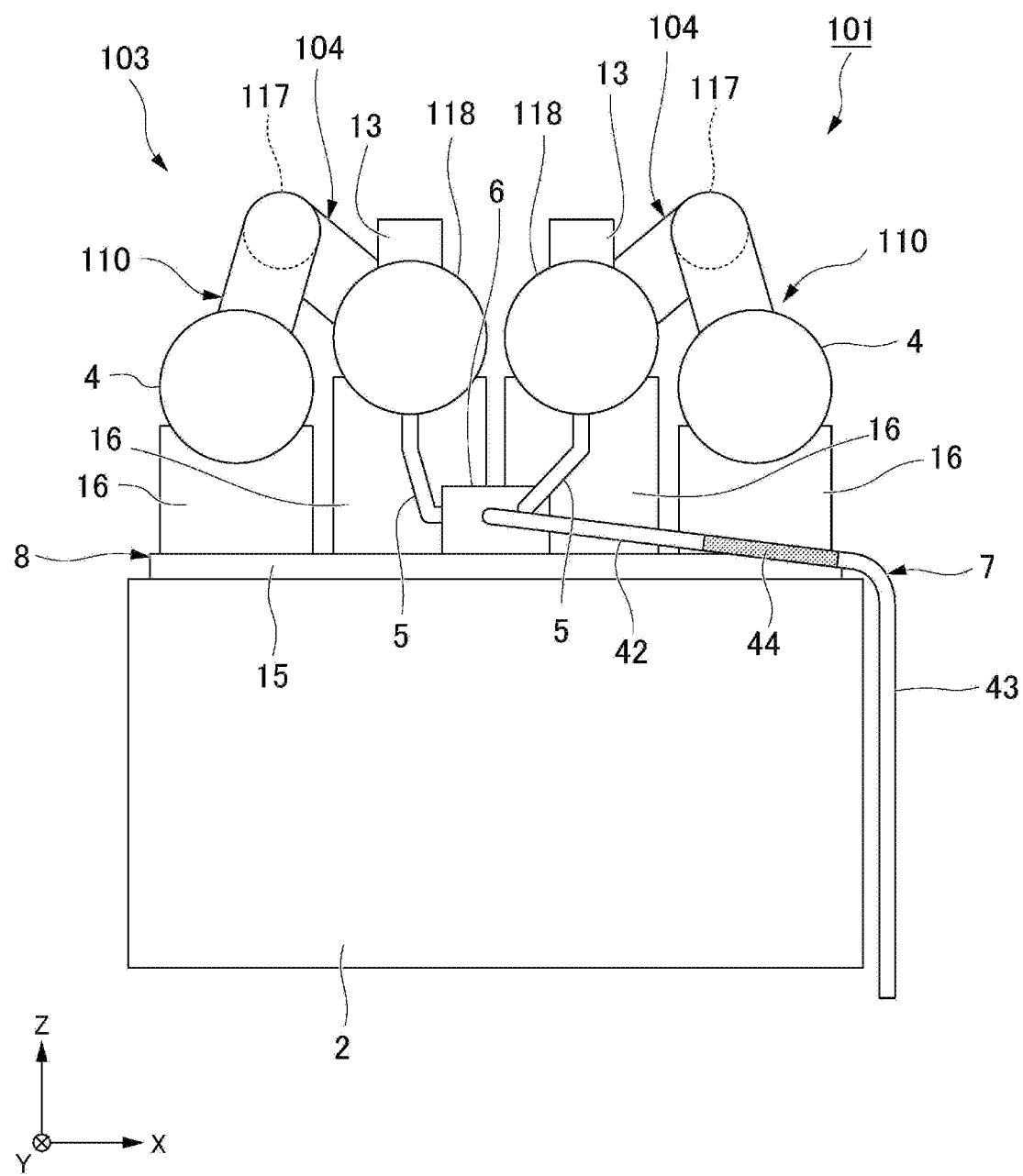
FIG. 12 is a front view showing an engine including an exhaust gas post-processing device according to another embodiment of the present invention.

As shown in FIG. 12, for example, the present invention may be applied to an exhaust gas post-processing device 103 including two types of exhaust gas post-processing units 4,104 and an engine 101 including the same. In the exhaust gas post-processing device 103 shown in FIG. 12, the first exhaust gas post-processing unit 4 is a DPF similar to that of the embodiment described above. On the other hand, the second exhaust gas post-processing unit 104 is a Urea SCR (Selective Catalytic Reduction) for purifying the nitrogen oxides (NOx) contained in the exhaust gas using Urea water.

The second exhaust gas post-processing unit 104 is disposed on the downstream side of the first exhaust gas post-processing unit 4 in the flow direction of the exhaust gas. The second exhaust gas post-processing unit 104 includes a mixing pipe 117 and a processing unit main body 118.

The mixing pipe 117 is disposed on the downstream side of the first exhaust gas post-processing unit 4 in the flow direction of the exhaust gas. In the mixing pipe 117, a Urea water having a mist-like form is introduced. In the mixing pipe 117, the misted Urea water and the exhaust gas introduced from the first exhaust gas post-processing unit 4 are mixed.

The processing unit main body 118 is disposed on a downstream side of the mixing pipe 117 in the flow direction of the exhaust gas. In the processing unit main body 118, the NOx contained in the exhaust gas introduced from the mixing exhaust gas 117 is reduced to purify the exhaust gas.

The processing unit main body 118 of the first exhaust gas post-processing unit 4 and the second exhaust gas post-processing unit 104 is disposed on an upper side of the engine main body 2 so that the first exhaust gas post-processing unit 4 and the processing unit main body 118 have the same exhaust gas flow direction (positive Y-axis direction) as one another. Further, the first exhaust gas post-processing unit 4 and the processing unit main body 118 are arranged at a distance from each other in the first horizontal direction (X-axis direction) on the upper side of the engine main body 2. The first exhaust gas post-processing unit 4 and the processing unit main body 118 are supported on the engine main body 2 by a support unit 8 including a support plate 15 and a support base 16.

A discharge pipe 13 for discharging the exhaust gas is connected to a downstream end of the processing unit main body 118 in the flow direction of the exhaust gas.

The mixing pipe 117 is disposed above the first exhaust gas post-processing unit 4 and the processing unit main body 118 in a manner such that the flow direction of exhaust gas in the mixing pipe 117 is opposite to the flow direction of exhaust gas in the first exhaust gas post-processing unit 4 and the processing unit main unit 118. The both ends of the mixing pipe 117 in a longitudinal direction are respectively connected to the downstream end of the first exhaust gas post-processing unit 4 in the flow direction of the exhaust gas and the upstream end of the processing unit main body 118 in the flow direction of the exhaust gas.

The exhaust gas post-processing device 103 shown in FTG. 12 includes two processing units 110 that combine a first exhaust gas post-processing unit 4 and a second exhaust gas post-processing unit 104. The two processing units 110 are arranged in the first horizontal direction so as to dispose two processing unit main bodies 118 between two first exhaust gas post-processing units 4.

In the exhaust gas post-processing device 103 illustrated in FIG. 12, the drain pipe 5 is connected to a lower portion of each processing unit main body 118 and extends downward from each processing unit main body 118. The lower end of each drain pipe 5 is connected to the junction member 6. The junction member 6 is located between the two processing unit main bodies 118.

Even in the exhaust gas post-processing device 103 shown in FIG. 12 and the engine 101 including the same, effects similar to those of the above-described embodiment can be obtained.

In the exhaust gas post-processing device of the present invention, the main introduction flow path of the junction member may be inclined downward while directed from the introduction port toward the intersection of the main introduction flow path with the discharge flow path (particularly, the main discharge flow path) in the horizontal direction, for example. In this case, moisture that has flowed into the main introduction flow path from the introduction port can easily flow toward the intersection of the main introduction flow path with the discharge flow path (main discharge flow path) due to its own weight. In other words, it is possible to suppress a retention of moisture in the main introduction flow path. Further, it is possible to prevent moisture from flowing into the introduction-side gas vent flow path from the main inlet flow path and to prevent moisture from being discharged from the introduction-side gas vent hole to the outside of the junction member.

In the exhaust gas post-processing device of the present invention, the main discharge flow path of the junction member may be inclined downward while directed from an intersection of the main discharge flow path with an introduction flow path (particularly, a main introduction flow path) toward an discharge port in a horizontal direction, for example. In this case, moisture flowing into the main discharge flow path from the intersection of the main discharge flow path with the introduction flow path (in particular, the main introduction flow path) can easily flow toward the discharge port due to its own weight. In other words, it is possible to suppress a retention of moisture in the main discharge flow path. Further, it is possible to prevent moisture from flowing into the discharge-side gas vent flow path from the main discharge flow path and to prevent moisture from being discharged from the discharge-side gas vent hole to the outside of the junction member.

In the exhaust gas post-processing device of the present invention, the number of the exhaust gas post-processing units to which the drain pipe is connected may be, for example, three or more. In this case, a plurality of introduction flow paths respectively corresponding to the plurality of exhaust gas post-processing units may be formed in the junction member.

The engine of the present invention may be applied to any work vehicle such as a dump truck, a hydraulic excavator, a bulldozer, an engine type forklift, or the like.

EXPLANATION OF REFERENCE SIGN 1, 101: Engine;
2: Engine main body;
3, 103: Exhaust gas post-processing device;
4, 4A, 4B, 104: exhaust gas post-processing unit;
5, 5A, 5B: Drain pipe;
6: Junction member;
7: Drainage pipe;
8: Support portion;
15: Support plate;
16: Support base;
20, 20A, 20B: Introduction flow path;
21: Introduction port;
22: Introduction-side gas vent hole;
23: Main Introduction flow path;
24: Introduction-side gas vent flow path;
30: Discharge flow path;
31: Discharge port;
32: Discharge-side gas vent hole;
33: Main Discharge flow path;
34: Discharge-side gas vent hole;
44: Elastic pipe

The invention claimed is:

1. An exhaust gas post-processing device comprising:
an exhaust gas post-processing unit into which an exhaust gas is introduced;
a drain pipe connected to a lower portion of the exhaust gas post-processing unit; and
a junction member,
wherein the junction member has:
an introduction flow path, one end of which is an introduction port connected to the drain pipe, the introduction flow path extending in a horizontal direction from the introduction port, and the other end of the introduction flow path being an introduction-side gas vent hole opened to an outside; and
a discharge flow path connected to a lower portion of the introduction flow path, the discharge flow path extending, in the horizontal direction, in a direction intersecting the introduction flow path, and an end portion of the discharge flow path being a discharge port opened to the outside,
wherein the exhaust gas post-processing device further comprises a drainage pipe connected to the discharge port,
wherein an end portion of the discharge flow path located on an opposite side of the discharge port in an extending direction of the discharge flow path is a discharge-side gas vent hole opened to the outside;
and wherein the discharge flow path includes:
a main discharge flow path that includes the discharge port and is connected to the introduction flow path, and
a discharge-side gas vent flow path that includes the discharge-side gas vent hole and is connected to the main discharge flow path, and
wherein a flow path cross-sectional area orthogonal to the discharge-side gas vent flow path provided in the extension direction of the discharge flow path is smaller than a flow path cross-sectional area of the main discharge flow path.

2. The exhaust gas post-processing device according to claim 1,
wherein the introduction flow path includes:
a main introduction flow path that includes the introduction port and is connected to the discharge flow path, and
an introduction-side gas vent flow path that includes the introduction-side gas vent hole and is connected to the main introduction flow path, and
wherein the main introduction flow path is inclined downward while directed from the introduction port toward an intersection portion of the main introduction flow path with the discharge flow path in a direction of a main discharge flow.

3. The exhaust gas post-processing device according to claim 1,
wherein the discharge-side gas vent flow path is located at an upper portion of the main discharge flow path.

4. The exhaust gas post-processing device according to claim 1,
wherein the discharge flow path includes:
a main discharge flow path that includes the discharge port and is connected to the introduction flow path, and
a discharge-side gas vent flow path that includes the discharge-side gas vent hole and is connected to the main discharge flow path, and
wherein, in a direction of a main discharge flow, the main discharge flow path is inclined downward from an intersection portion of the main discharge flow path with the introduction flow path toward the discharge port.

5. The exhaust gas post-processing device according to claim 1,
wherein a plurality of exhaust gas post-processing units are provided, and
wherein the junction member includes a plurality of the introduction flow paths, each introduction flow path corresponding to each of the plurality of the exhaust gas post-processing units.

6. The exhaust gas post-processing device according to claim 5,
wherein the plurality of introduction flow paths are intersected with each other and arranged in a vertical direction.

7. The exhaust gas post-processing device according to claim 5,
wherein two exhaust gas post-processing units are arranged horizontally,
the junction member is located between the two exhaust gas post-processing units, and
the drainage pipe extends from the junction member to one side of an arrangement direction of the two exhaust gas post-processing units.

8. The exhaust gas post-processing device according to claim 7, wherein the plurality of introduction flow paths are intersected with each other and arranged in a vertical direction.

9. An engine comprising:
the exhaust gas post-processing device according to claim 1; and
an engine main body configured to discharge exhaust gas.

10. The exhaust gas post-processing device according to claim 1,
wherein the introduction flow path includes:
a main introduction flow path that includes the introduction port and is connected to the discharge flow path, and
an introduction-side gas vent flow path that includes the introduction-side gas vent hole and is connected to the main introduction flow path, and
wherein a flow path cross-sectional area orthogonal to the introduction-side gas vent flow path provided in an extension direction of the introduction flow path is smaller than a flow path cross-sectional area of the main introduction flow path.

11. The exhaust gas post-processing device according to claim 10,
wherein the main introduction flow path is inclined downward while directed from the introduction port toward an intersection portion of the main introduction flow path with the discharge flow path in a direction of a main discharge flow.

12. The exhaust gas post-processing device according to claim 10,
wherein a plurality of exhaust gas post-processing units are provided, and
wherein the junction member includes a plurality of the introduction flow paths, each introduction flow path corresponding to each of the plurality of the exhaust gas post-processing units.

13. The post-processing device according to claim 10,
wherein the introduction-side gas vent flow path is located at an upper portion of the main introduction flow path.

14. The exhaust gas post-processing device according to claim 13,
wherein the main introduction flow path is inclined downward while directed from the introduction port toward an intersection portion of the main introduction flow path with the discharge flow path in a direction of a main discharge flow.

15. An engine comprising:
the exhaust gas post-processing device according to claim 10; and an engine main body configured to discharge exhaust gas.

* * * * *